United States Patent
Fetterolf et al.

(10) Patent No.: US 11,153,104 B2
(45) Date of Patent: Oct. 19, 2021

(54) GENERATING KEY MATERIAL FOR INFORMATION SECURITY USING A RESISTIVE PROCESSING UNIT (RPU) ACCELERATOR ARRAY AS A PHYSICALLY UNCLONABLE FUNCTION (PUF)

(71) Applicant: International Business Machines Corporation, Armonk, NY (US)

(72) Inventors: Shawn Peter Fetterolf, Cornwall, VT (US); Arvind Kumar, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 16/353,149

(22) Filed: Mar. 14, 2019

(65) Prior Publication Data
US 2020/0295953 A1 Sep. 17, 2020

(51) Int. Cl.
*H04L 9/32* (2006.01)
*H04L 9/08* (2006.01)
*G06N 3/08* (2006.01)

(52) U.S. Cl.
CPC .......... *H04L 9/3278* (2013.01); *H04L 9/0869* (2013.01); *G06N 3/08* (2013.01)

(58) Field of Classification Search
CPC ........ H04L 9/3278; H04L 9/0869; G06N 3/08
See application file for complete search history.

(56) References Cited

U.S. PATENT DOCUMENTS

| | | | | |
|---|---|---|---|---|
| 9,742,563 | B2* | 8/2017 | Gotze | H04L 9/0866 |
| 9,852,790 | B1* | 12/2017 | Gokmen | G06N 3/088 |
| 10,134,472 | B1* | 11/2018 | Leobandung | G11C 16/0408 |
| 2010/0246829 | A1* | 9/2010 | McGrew | H04L 9/0869 380/278 |
| 2011/0317829 | A1 | 12/2011 | Ficke et al. | |

(Continued)

OTHER PUBLICATIONS

Phil Knag et al, A Native Stochastic Computing Architecture Enabled by Memristors, IEEE (Year: 2014).*

(Continued)

*Primary Examiner* — Shanto Abedin
(74) *Attorney, Agent, or Firm* — Jeffrey S. LaBaw; David H. Judson

(57) ABSTRACT

Crossbar arrays (e.g., Resistive Processing Unit (RPU) accelerators) are leveraged to create a Physically Unclonable Function (PUF) that exploits variations, such as statistical process variation in manufacture or operation, to generate key material to secure information in a computing environment. One environment is a cloud compute infrastructure whose shared resources are used to process workloads. During RPU accelerator use, the state of the RPU's bits are changed by reproducible inputs, e.g., stochastic pulses applied to change resistive values in the array, and the corresponding changes in the RPU array state captured. These responses, which cannot be reproduced from another device due to random device variations across chips that embody the RPUs, are then used to generate (or facilitate generation of) the cryptographic material. In one embodiment, inputs applied to the RPU accelerator array are generated from a pseudo-random number generator that is otherwise associated with the RPU accelerator.

21 Claims, 5 Drawing Sheets

(56) References Cited

U.S. PATENT DOCUMENTS

| | | | |
|---|---|---|---|
| 2016/0149697 A1* | 5/2016 | Doege | G09C 1/00 |
| | | | 713/189 |
| 2016/0371896 A1 | 12/2016 | Mantese et al. | |
| 2017/0109626 A1* | 4/2017 | Gokmen | G06N 3/08 |
| 2017/0359082 A1 | 12/2017 | Riedel et al. | |
| 2018/0005110 A1* | 1/2018 | Gokmen | G06N 3/063 |
| 2018/0253642 A1 | 9/2018 | Gokmen et al. | |
| 2018/0316493 A1* | 11/2018 | Kvatinsky | H04L 9/3242 |

OTHER PUBLICATIONS

Chua, "Memristor: The Missing Circuit Element," IEEE Transactions on Circuit Theory, vol. 18, No. 5, Sep. 1971.

Stathopoulos, et al., "Multibit memory operation of metal oxide bi-layer memristors," Scientific Reports, www.nature.com/scientific reports, Dec. 13, 2017.

Aysu, et al., "Hardware/software co-design of physical unclonable function based authentications on FPGAs," Microprocessors and Microsystems 39.7 (2015), pp. 589-597.

Kardas, et al.,"PUF-enhanced offline RFID security and privacy," Journal of Network and Computer Applications 35 (2012), pp. 2059-2067.

Frikken, et al., "Robust Authentication Using Physically Unclonable Functions," P. Samarati et al., ISC 2009, LNCS 5735 (2009), pp. 262-277.

* cited by examiner

GENERATING KEY MATERIAL FOR INFORMATION SECURITY USING A RESISTIVE PROCESSING UNIT (RPU) ACCELERATOR ARRAY AS A PHYSICALLY UNCLONABLE FUNCTION (PUF)

BACKGROUND OF THE INVENTION

Technical Field

This disclosure relates generally to methods and systems for computationally-efficient generation of cryptographic material (e.g., keys, signatures, and the like) for information security.

Background of the Related Art

Machine learning is the notion used to broadly describe a primary function of electronic systems that learn from data. In machine learning and cognitive science, artificial neural networks (ANNs) or deep neural networks (DNNs) are a family of statistical learning models inspired by the biological neural networks and, in particular, the brain. Such neural networks can be used to estimate or approximate systems and functions that depend on a large number of inputs and are generally unknown. It is known to form an ANN or DNN from high density, low cost analog circuit architectures known as crossbar arrays. A basic crossbar array configuration includes a set of conductive row wires and a set of conductive column wires formed to intersect the set of conductive row wires. The intersections between the two sets of wires are separated by so-called cross-point devices, which can be formed from thin film material. Large crossbar arrays of analog elements are used to speed up (accelerate) computations such as matrix multiplication, and thus are known as accelerators. Accelerators based on crossbar arrays of analog elements known as Resistive Processing Units (RPUs) have shown great promise to speed up deep learning workloads.

As more deep learning is supported in cloud using RPU-based accelerators, additional security protocols are needed to ensure privacy and to prevent malicious access to data.

BRIEF SUMMARY

According to this disclosure, crossbar arrays (e.g., Resistive Processing Unit (RPU) accelerators) are leveraged to create a Physically Unclonable Function (PUF), which is a function that exploits variations, such as statistical process variation in manufacture or operation, to generate cryptographic key material for use to secure information in a computing environment. According to one embodiment of this disclosure, RPU-based analog accelerators are re-purposed (even as they otherwise are used to process the workload itself) to generate the cryptographic materials, such as secret keys, signatures, and the like. In particular, during RPU accelerator use in a given application, the state of the RPU's bits are changed by a known and reproducible inputs (e.g., one or more sets of stochastic pulses applied to change resistive values in the array) and the corresponding responses (e.g., changes in the RPU array state) captured. These responses, which cannot be reproduced from another accelerator array due to random device variations across chips that embody the RPUs, are then used to generate (or facilitate generation of) the cryptographic material. In one embodiment, the inputs applied to the RPU accelerator array (being used for the PUF) are generated from a pseudo-random number generator (PRNG) that is otherwise associated with the RPU accelerator. An alternative is to use responses from the RPU accelerator array as input to the PRNG.

An advantage of this approach is that the security infrastructure used to create the cryptographic material remains masked as part of the main computing architecture for the workload processing.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The following describes subject matter as background.

Crossbar Arrays

By way of background, crossbar arrays are high density, low cost circuit architectures used to form a variety of electronic circuits and devices, including ANN architectures, neuromorphic microchips and ultra high-density non-volatile memory. As mentioned above, a basic crossbar array configuration includes a set of conductive row wires and a set of conductive column wires formed to intersect the set of conductive row wires. The intersections between the two sets of wires are separated by so-called cross-point devices, which can be formed from thin film or other material. Other cross-point devices could be a charge trap transistor, a SONOS device, a floating gate memory cell, and the like.

Figure 1:
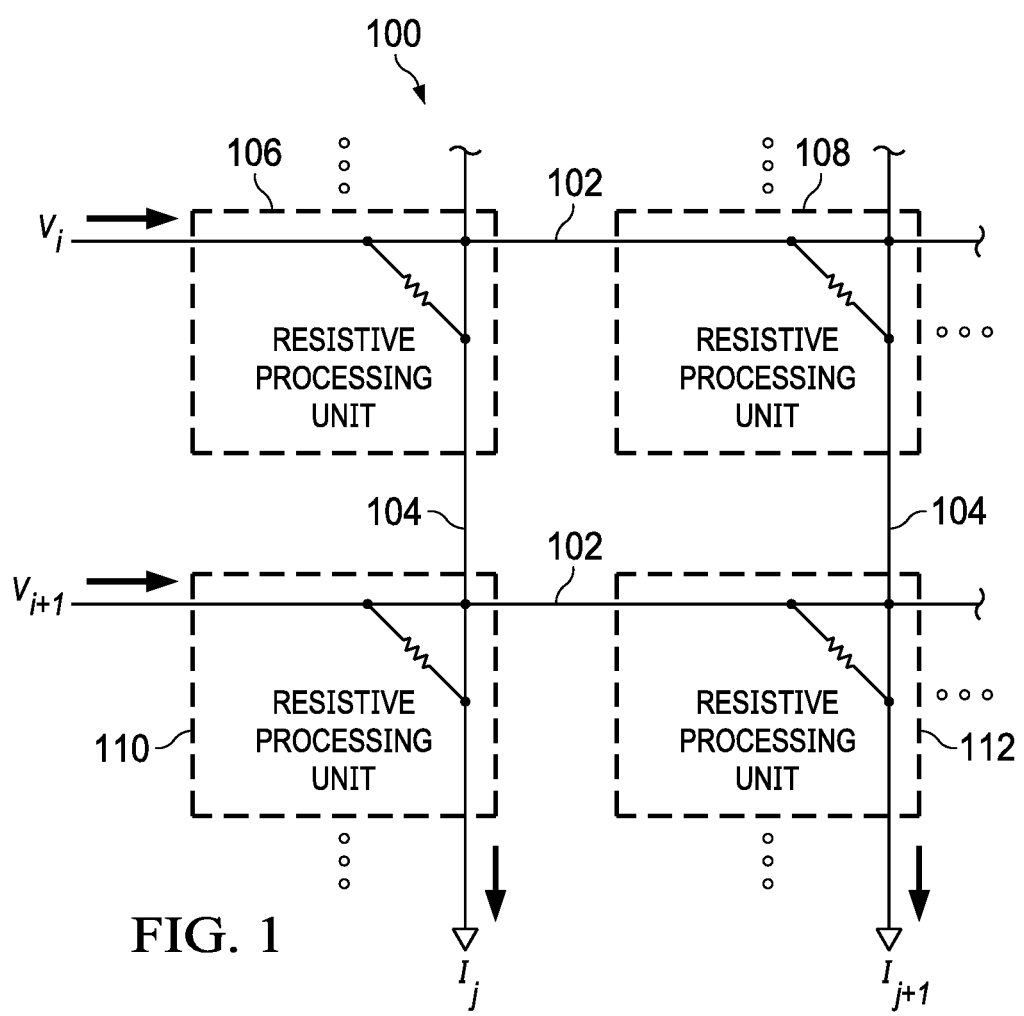
FIG. 1 depicts an exemplary Resistive Processing Unit (RPU) accelerator array.

FIG. 1 depicts a representative accelerator that is based on a crossbar array 100 of Resistive Processing Units (RPUs). In this simplified example, there array 100 comprises the conductive row wires 102, and the set of conductive column wires 104 formed to intersect the set of conductive row wires 102. At the intersections between the two sets of wires are cross-point devices in the form of Resistive Processing Units (RPUs) 106, 108, 110 and 112. The array here is highly simplified for this description, as a typical array comprises a large number of RPUs, e.g., a 512×512 array. Conductance values (of the RPUs) 106, 108, 110 and 112 represent the values of elements in a matrix. Voltage inputs ($V_j$, $V_{j+1}$) form an input vector, and the resulting outputs, namely, the current readings ($I_j$, $I_{j+1}$), are an output vector. Various operations (e.g., forward pass, backward pass, weight update) can be applied to the array for computational purposes. A known approach is to use large crossbar arrays of analog elements to speed up matrix multiplication.

Resistive Processing Units (RPUs) for DNN Workload Processing

As described above, in machine learning and cognitive science, artificial neural networks (ANNs) or deep neural networks (DNNs) are a family of statistical learning models inspired by the biological neural networks. ANNs can be used to estimate or approximate systems and functions that depend on a large number of inputs and are generally unknown. As also mentioned, it is known to form ANNs and DNNs from crossbar arrays of two-terminal RPUs, such as those depicted in FIG. 1. Generalizing, crossbar arrays are high density, low cost circuit architectures used to form a variety of electronic circuits and devices, including ANN architectures, neuromorphic microchips and ultra high-density nonvolatile memory.

In particular, ANNs or DNNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs or DNNs that carry electronic messages between simulated neurons are provided with numeric weights that correspond to the strength or weakness of a given connection. The weights can be adjusted and tuned based on experience, making the neural network adaptive to inputs and capable of learning. For example, a neural network for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Cross-point devices, in effect, function as the neural network's weighted connections between neurons. Nanoscale two-terminal devices, for example memristors having suitable conductance state switching characteristics, are often used to model the cross-point devices to emulate synaptic plasticity with high energy efficiency. The conductance state (e.g., inverse of resistance) of the memristor material can be altered by controlling the magnitude and duration of voltages applied between individual wires of the row and column wires. Digital data can be stored by alteration of the memristor material's conductance state at the intersection to achieve a high conduction state or a low conduction state. The memristor material can also be programmed to maintain two or more distinct conductance states by selectively setting the conductance state of the material. The conductance state of the memristor material can be read by applying a voltage across the material and measuring the current that passes through the target cross-point device.

Physically Unclonable Function (PUF)

A physically unclonable function (PUF) exploits variations, such as statistical process variation in manufacture or operation, to generate secret keys used in cryptographic operations, chip authentication, and even random number generation. A device that supports a PUF yields different responses to different challenge inputs. Authentication of a device using a PUF is performed by supplying a challenge input to the device to which the response of an authentic device is known. The response is a result of a function that, by definition, is not clonable. For example, a PUF may result from process variations in the production of otherwise identical devices. As a result of the process variations, the otherwise identical devices may respond with a different series of bits in response to a set of challenge input bits. An expected response to each of one or more sets of challenge inputs is determined empirically for each of the devices by determining a response to each of the one or more sets of challenge bits. A particular device may authenticate itself by providing the expected response to the one or more sets of challenge bits recorded for that particular device. Common circuit choices to implement a PUF may include using a ring oscillator or a multiplexer arbiter scheme.

Using an RPU as a PUF for Cryptographic Material Generation

Figure 2:
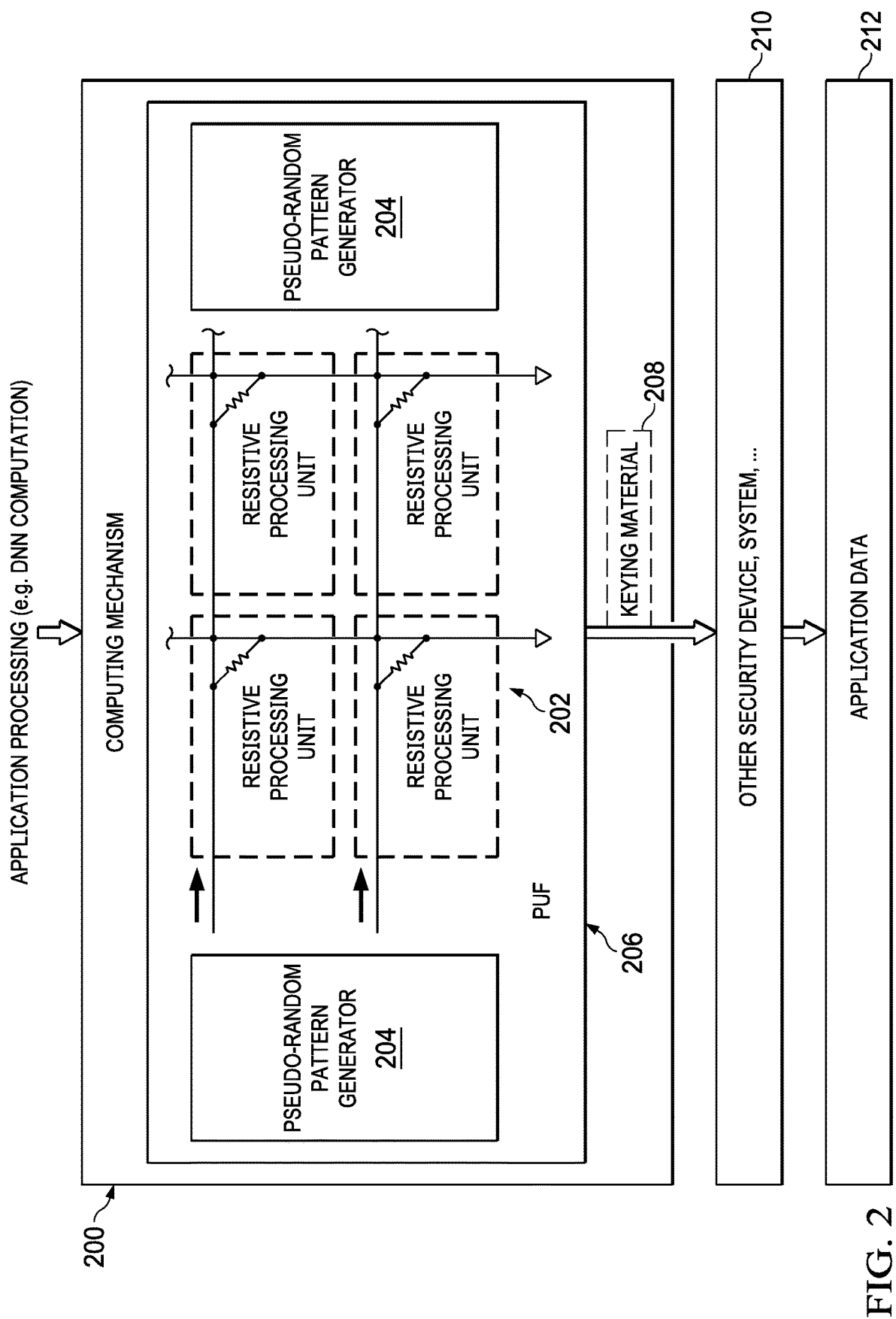
FIG. 2 depicts an RPU accelerator array and an associated Pseudo-Random Pattern Generator (PRPG) that together comprise a Physically Unclonable Function (PUF) useful to generate keying material for information security in a computing environment according to the technique of this disclosure.

With the above as background, the technique of this disclosure is now described. According to this disclosure, a PUF is implemented using an accelerator formed of RPUs, such as depicted in FIG. 1. FIG. 2 depicts the basic notion. In this approach, an existing computing mechanism 200 comprising RPU array 202 and its associated pseudo-random pattern generator (PRPG) 204 are re-purposed (i.e. leveraged) as a PUF 206. The PUF 206 outputs keying material 208, and the keying material 208 is provided to one or more other security devices, processes, applications, utilities, or the like 210 to facilitate securing application data 212 that is otherwise being processed by the computing mechanism. The nature of the computing mechanism may vary; a typical use case is a deep learning application being processed, for instance, in a cloud computing environment. In this approach, the computing mechanism 200 is being used for computation, e.g., accelerating matrix multiplication during generation of a DNN model. During such use, the RPU array 202 and its associated PRPG 204 are controlled in a manner described below to create the PUF 206. In this manner, the PUF 206 and computing mechanism 200 are used concurrently for two (2) different purposes, the normal processing of the workload, as well as the generation of keying material useful to secure that workload. While this configuration is preferred, the RPU array 202 may leverage another source of the randomized data, such as an external random number generator (RNG).

According to this disclosure, crossbar arrays (e.g., Resistive Processing Unit (RPU) accelerators) are leveraged to create a Physically Unclonable Function (PUF), namely, a function that exploits variations, such as statistical process variation in manufacture or operation, to generate cryptographic key material for use to secure information in a computing environment. An example environment is a cloud compute infrastructure whose shared resources are being used to process information, such as deep learning workloads, although this is not a limitation.

According to one embodiment of this disclosure, RPU-based analog accelerators are re-purposed (even as they otherwise are used to process the workload itself) to generate the cryptographic materials, such as secret keys, signatures, and the like. In particular, during RPU accelerator use in a given application, the state of the RPU's bits are changed by a known and reproducible set of inputs (e.g., one or more sets of stochastic pulses applied to change resistive values in the array) and the corresponding responses (e.g., changes in the RPU array state) captured. These responses, which cannot be reproduced from another accelerator array due to random device variations across chips that embody the RPUs, are then used to generate (or facilitate generation of) the cryptographic material. In one embodiment, the aforementioned inputs applied to the RPU accelerator array (being used for the PUF) are generated from a pseudo-random pattern generator (PRPG) that is otherwise associated with the RPU accelerator. An alternative embodiment is to use responses from the RPU accelerator array as input to the PRPG. A further example is to use the PRPG to generate a sample description to randomly selects which rows, columns, or individual bits of the RPU to use in generating the cryptographic material.

Generalizing, during RPU use in a given application, the given state represented by the RPU's bits is changed, thus through application-based use, additional entropy is induced when the RPU's value states are exploited as inputs (or otherwise) for key generation. This processing is now described in additional detail.

Figure 3:
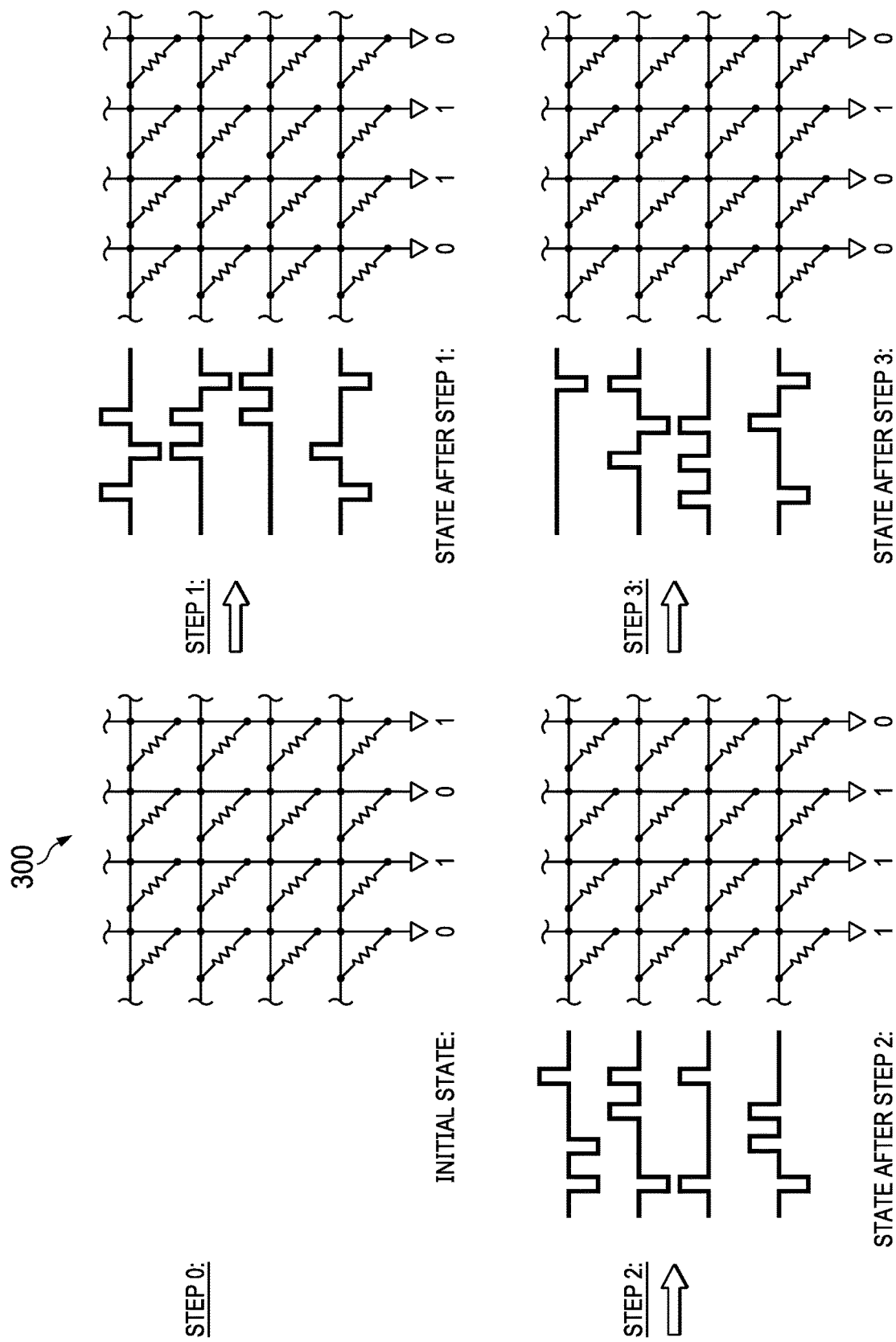
FIG. 3 depicts an example method of this disclosure by which an RPU accelerator array is used to generate a data string for key generation.

In particular, and with reference to FIG. 3, the technique of this disclosure by which an RPU accelerator array is used to create a PUF for key material generation is depicted by way of example. In FIG. 3, the RPU array 300 comprises a set of 4×4 RPUs, similar to the arrangement shown in FIG. 1. The 4×4 configuration shown in the drawing is provided for ease of illustration, as typically an RPU array will be significantly larger. As depicted, a data string for use in generating key material is generated according to a set of steps, step (0) through step (3) in this example scenario. There may be any number of steps (operations). As will be seen, typically one or more of the steps involve the application to the RPU array 300 of an input, and the capturing of changes to the array based on the input. Typically, the input is a series of stochastic pulses applied to some select group of rows in the array, thereby having the effect of changing the resistance of the elements in that row (e.g., from a first to a second number of ohmic steps). A set of pulses is stochastic if each of the pulses in the sequence is considered as a sample of one element from a probability distribution.

As depicted, and at step (0), the array 300 is initialized with the resistance values being close to mid-range values. With this array initialized, and using 1-bit analog-to-digital (A/D) conversion, an output (e.g., initial state being {0, 1, 0, 1}) is read out from the array. At step (1), and with the array initialized to the state from step (0), a first set of stochastic pulses are supplied to some select group of rows in the array. In one embodiment, the set of pulses originate from a source, e.g., an RNG/PRNG, a PRPG, or the like. As described above with respect to FIG. 2, one useful source of such randomness is a PRNG associated with the array itself. Application of the pulses changes some of the resistance values in the array, with the resulting output (e.g., state after step (1) being {0, 1, 1, 0}) being read from the array. The process then continues as shown.

In particular, at step (2), a new series of stochastic pulses is supplied to the array (with the values existing after step (1)), thereby generating a new output (e.g., {1, 1, 1, 0}). The array with that state is then subjected to another set of pulses in step (3), thereby generating yet another output (e.g., {0, 0, 1, 0}, and so on (if additional steps/operations are performed). Thus, and as can be seen, the RPU array is initialized; one or more inputs cause the given state of the RPU's bit to change. The output(s) from these operations are then collected. In this example, the output bit vectors are concatenated into a data string {0101|0110|1110|0010| . . . }. This data string is unique to the RPU array, as random device variations exhibited by the device cannot be reproduced on an imitation chip. Additional entropy is guaranteed by virtue of the input seed values, which preferably originate from the PRNG. Random bit selection using PRPG or PRNG data can further increase entropy in the generation of the data string. Similarly, as the RPU is used for its intended application, additional entropy is injected as a result of the implied randomness in the application data.

The data string resulting from this process is then useful to facilitate key material generation.

Figure 4:
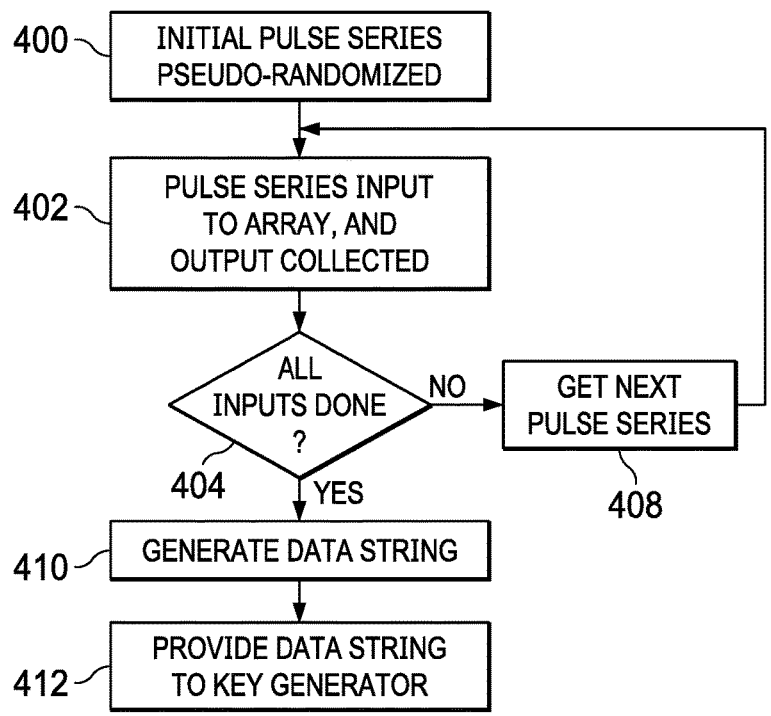
FIG. 4 depicts a process flow for a first embodiment of a method used to generate a data string according to this disclosure.
Figure 5:
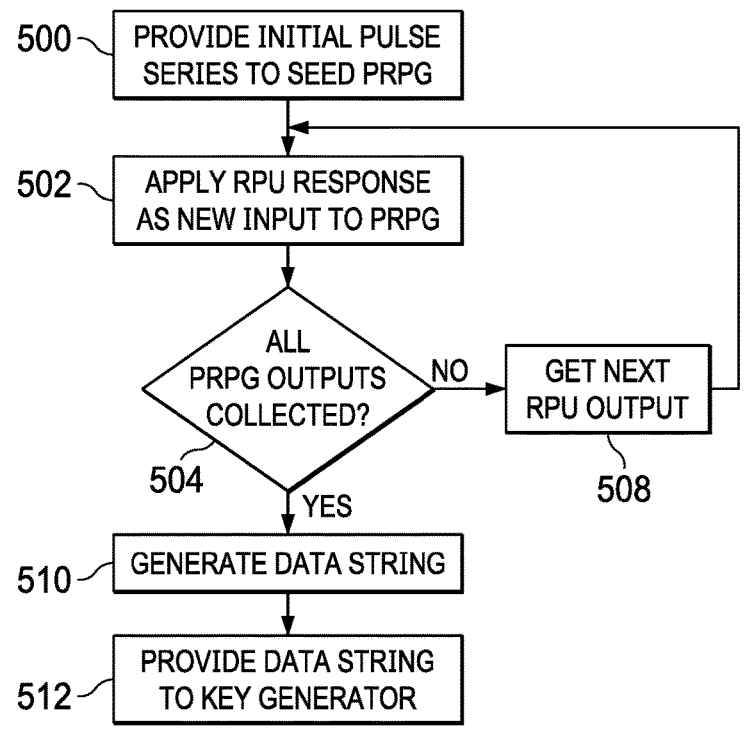
FIG. 5 depicts a process flow for a second embodiment of a method used to generate a data string according to this disclosure.
Figure 6:
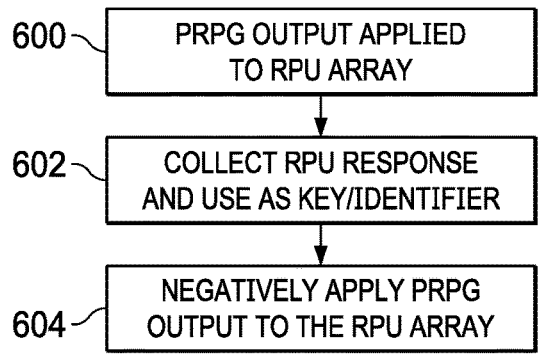
FIG. 6 depicts a process flow for a third embodiment of a method used to generate a data string according to this disclosure.

Thus, for example, the pulse series (the input) generated at each step (either randomly, pseudo-randomly, or through some known external method) is stored, together with the corresponding RPU response (the output). One or more of the outputs are then assembled (e.g., via concatenation) into a resulting data string used to facilitate creation of the key material desired. FIGS. 4, 5 and 6 depict representative process flows detailing several embodiments. Each of the embodiments assume the use of the RPU array and its associated PRPG, such as described and depicted in FIG. 2.

The process flow in FIG. 4 corresponds to the example described above with respect to FIG. 3. Thus, at step 400, the initial pulse series is pseudo-randomized on definition, e.g., received from the PRPG/PRNG together with a seed value (the initial array resistances), and a value representing a number of clocks (corresponding to a number of steps or iterations). At step 402, the pulse series is supplied as an input to the array, and the resulting output is collected. At step 404, a test is performed to determine if all of the inputs to the array (i.e., components of the data string) have been processed. If so, the routine branches. If additional iterations (against additional series of pulse(s)) are required, the routine obtains a next pulse series at step 408 and returns to step 402. Once all of the inputs are processed against the RPU array, the outputs are assembled (or otherwise processed) at step 410 to generate the data string. The particular computation at step 410 may vary, but typically it includes some concatenation operation. How concatenation is performed can further drive entropy, e.g., by using a random selection criterion to determine if bits are concatenated or discarded during the concatenation step, thereby defining a bit mask that is itself random. Other operations may include bit-wise operations (AND, OR, XOR, etc.). At step 412, the data string is provided to a key generator to generate a key. Thus, in this embodiment the data string (formed from the RPU array outputs) is used as a key or other identification. Further, because the seed value and the number of steps applied to the pulse series definition are known, the process of generating the data string is repeatable.

FIG. 5 depicts an alternative embodiment wherein the RPU array states are used as input(s) to the PRPG, and with the data string then generated from the resulting PRPG outputs. This process begins at step 500 with an initial pulse series used as a seed value to a PRPG, and to extract a value from the RPU. At step 502, the RPU response is used as a new input to the PRPG. The output from the PRPG is then saved and used to extract a new from the RPU. At step 504, a test is performed to determine if all of the outputs from the PRPG have been collected. If so, the routine branches. If additional iterations (against additional series of RPU responses) are required, the routine obtains a next RPU output at step 508 and returns to step 502. Once all of the RPU responses generated by array are processed, the PRPG outputs are assembled (or otherwise processed) at step 510 to generate the data string. The particular computation at step 510 may vary, but typically it includes some concatenation operation. At step 512, the data string is provided to a key generator to generate a key. Thus, in this embodiment the data string (formed from the PRPG outputs) is a convolution of input and output, and it is suitable for key usage or identification. Like the embodiment in FIG. 4, this process is repeatable.

FIG. 6 depicts yet another embodiment. Like the embodiment shown in FIG. 4, the RPU array response(s) are used to generate the data string directly. Thus, at step 600 the PRPG (or PRNG) output itself is applied to the RPU array as a direct stimulus. At step 602, the RPU response is collected and used as the key or identification. At step 604, the PRPG output (which had been saved) is negatively applied to the RPU array as a stimulus to return the RPU to its original state. In particular, when the same PRPG or PRNG (as the case may be) bit sequence is applied in its inverted form, the resulting pulse sequence returns the RPU to its original state. This embodiment, being based as it is on the PRPG (or PRNG) output, thus is not repeatable (i.e. it is random).

The above examples are merely representative of various ways in which an RPU may be configured and used with a source of random, pseudo-random or other known values, to generate additional entropy when the RPU value states are exploited (as inputs or outputs) to generate a key or other identifying information. One skilled in the art will appreciate that there are many variants to the above-described method. Thus, for example, and to increase obfuscation, multiple time stages may be implemented. In another variant, the rows and/or columns selected for pulse series application and output detection are randomized. In still another variant, different portions of the RPU may be selected for different iterations. Another example variant implements both random selection of the rows and/or columns together with selection of application of the inputs to distinct sub-arrays. Combinations of one or more of the above obfuscation techniques may also be used. Further, there is no requirement that the RPU array be driven by a particular source of randomization, as multiple data sources may be used with the same RPU array, and likewise the same RPU may be used to drive separate PRPGs, with their corresponding outputs assembled to create the data string.

The notion of the "data string" as used herein typically refers to key material or other identification string desired, or it may correspond to an intermediate string that is then used to compute the key or identification.

In a preferred embodiment, the existing elements in an analog-based RPU accelerator (which include the PRPG) are used to enable key generation. An advantage of this approach is that the security infrastructure used to create the cryptographic material itself remains masked as part of the main computing architecture for the workload processing. Thus, and according to an aspect of this disclosure, the operations such as depicted in FIG. 4, FIG. 5 or FIG. 6 are carried out in conjunction with the processing of the workload itself (including using the RPU accelerator for that purpose). For example, the key material generation may occur before the workload is processed, during (i.e. mid-computation), or after. In a particular embodiment, the workload is associated with a deep learning application that is using the accelerator for a computation, and the key material is generated during a learning phase of the machine learning.

Thus, and in this context, the RPU accelerator has a dual purpose, namely, functioning as both a compute element, and as a source of entropy for the key generator. Whether implemented in association with an existing PRPG/RPU compute element, typically the pulse series application and output detection operations are carried out and managed by a control program, typically a computer program executed by a hardware processor. The control program is configured to carry out one or more of the processes depicted in FIGS. 4-6.

When a new PUF is needed, the crossbar array is returned to an original (or some other defined) state, a new pulse series is applied and the corresponding output detected, etc., all as described above.

As used herein, the RPU array, either driven by the PRPG or used to drive the PRPG, is configured as a PUF. The PUF is used to generate a data string that is the key or other identifying material, or that can be used to generate the key or other identifying material. Thus, and depending on how the data string is to be used, the notion of processing one or more outputs from the RPU array into a data string may be tantamount to actual generation of the desired key or other identifying material itself. Stated another way, the information output from either the RPU (when driven from the PRPG) or the PRPG (when driven from the RPU) is used directly or indirectly to generate the key or other material to secure information.

During RPU use in a given application, the given state of the RPU's bits is changing. Although the preferred approach herein is to use the PRPG-generated pulse series to generate the RPU array bit strings, it should be appreciated that the RPU values states themselves (as created by the computation being performed) can also be exploited as inputs (or otherwise) to facilitate the key generation.

The above-described techniques herein may be implemented advantageously in a number of environments including, without limitation, a cloud compute environment. With the cloud computing environment in particular, the approach herein generates keying material used to secure compute workloads, such as (without limitation) deep learning models, associated data, and the like. The techniques may also be used with a standalone computing device, e.g. a smartphone or tablet, with portable/personal computers, vehicles, Internet of Things (IoT) sensors, edge computers, routers, special purpose chips for artificial intelligence, and many others.

The following describes a basic computing architecture in which the subject matter herein may be implemented.

Figure 7:
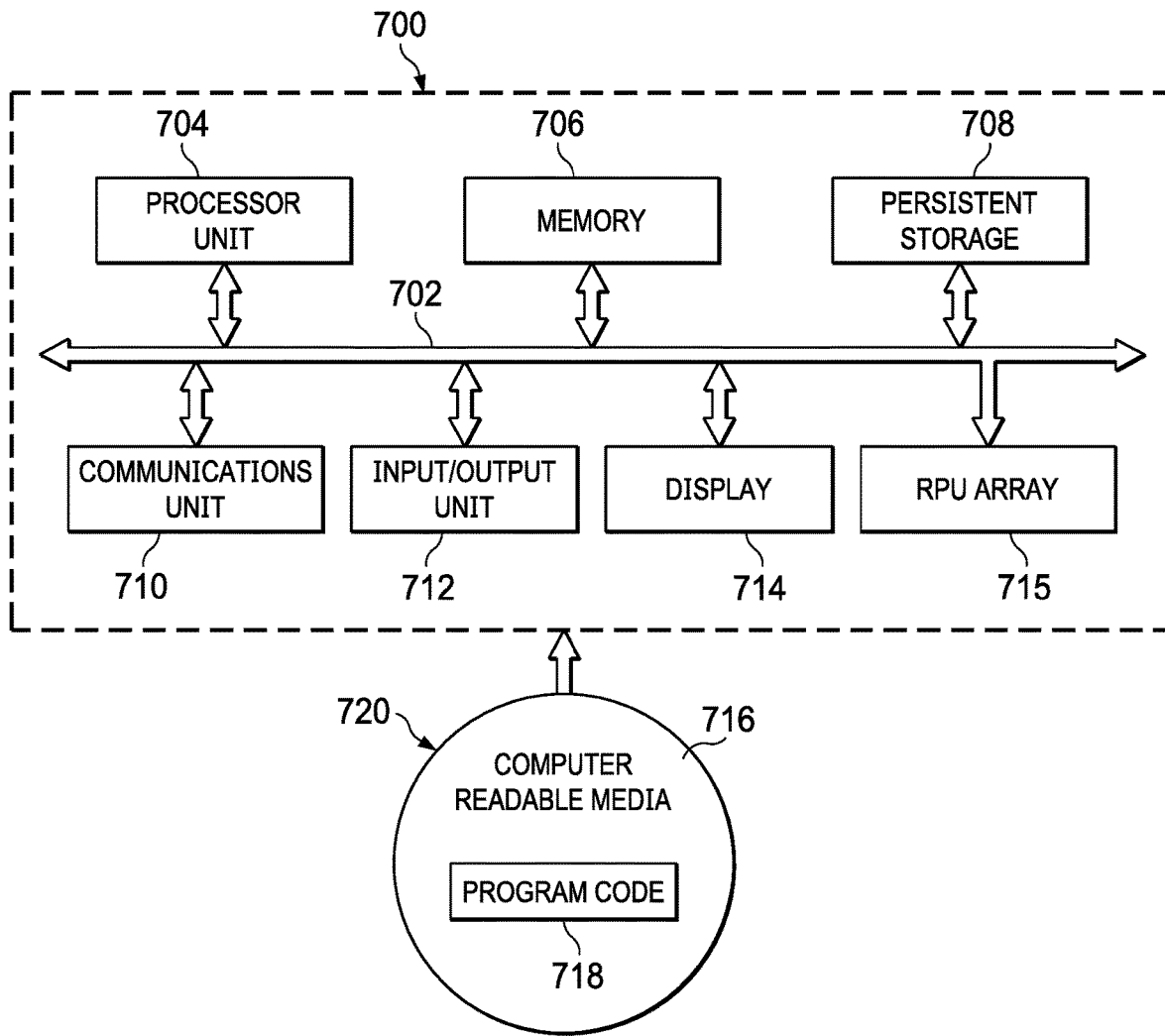
FIG. 7 is a block diagram of a data processing system in which exemplary aspects of the illustrative embodiments may be implemented.

With reference now to FIG. 7, a block diagram of a data processing system is shown in which illustrative embodiments (such as the process flows in FIG. 4-6) may be implemented. Data processing system 700 is an example of a computer in which computer-usable program code or instructions implementing the processes may be located for the illustrative embodiments. In this illustrative example, data processing system 700 includes communications fabric 707, which provides communications between processor unit 704, memory 706, persistent storage 708, communications unit 710, input/output (I/O) unit 717, display 714, and, according to this disclosure, an accelerator array 715 such as described above.

Processor unit 704 serves to execute instructions for software that may be loaded into memory 706. Processor unit 704 may be a set of one or more processors or may be a multi-processor core, depending on the particular implementation. Further, processor unit 704 may be implemented using one or more heterogeneous processor systems in which a main processor is present with secondary processors on a single chip. As another illustrative example, processor unit 704 may be a symmetric multi-processor (SMP) system containing multiple processors of the same type.

Memory 706 and persistent storage 708 are examples of storage devices. A storage device is any piece of hardware that is capable of storing information either on a temporary basis and/or a permanent basis. Memory 706, in these examples, may be, for example, a random access memory or any other suitable volatile or non-volatile storage device. Persistent storage 708 may take various forms depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 717 allows for input and output of data with other devices that may be connected to data processing system 700. For example, input/output unit 717 may provide a connection for user input through a keyboard and mouse. Further, input/output unit 717 may send output to a printer. Display 714 provides a mechanism to display information to a user.

Instructions for the operating system and applications or programs are located on persistent storage 708. These instructions may be loaded into memory 706 for execution by processor unit 704. The processes of the different embodiments may be performed by processor unit 704 using computer implemented instructions, which may be located in a memory, such as memory 706. These instructions are referred to as program code, computer-usable program code, or computer-readable program code that may be read and executed by a processor in processor unit 704. The program code in the different embodiments may be embodied on different physical or tangible computer-readable media, such as memory 706 or persistent storage 708.

Program code 716 is located in a functional form on computer-readable media 718 that is selectively removable and may be loaded onto or transferred to data processing system 700 for execution by processor unit 704. Program code 716 and computer-readable media 718 form computer program product 720 in these examples. In one example, computer-readable media 718 may be in a tangible form, such as, for example, an optical or magnetic disc that is inserted or placed into a drive or other device that is part of persistent storage 708 for transfer onto a storage device, such as a hard drive that is part of persistent storage 708. In a tangible form, computer-readable media 718 also may take the form of a persistent storage, such as a hard drive, a thumb drive, or a flash memory that is connected to data processing system 700. The tangible form of computer-readable media 718 is also referred to as computer-recordable storage media. In some instances, computer-recordable media 718 may not be removable.

Alternatively, program code 716 may be transferred to data processing system 700 from computer-readable media 718 through a communications link to communications unit 710 and/or through a connection to input/output unit 717. The communications link and/or the connection may be physical or wireless in the illustrative examples. The computer-readable media also may take the form of non-tangible media, such as communications links or wireless transmissions containing the program code. The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. As one example, a storage device in data processing system 700 is any hardware apparatus that may store data. Memory 706, persistent storage 708, and computer-readable media 718 are examples of storage devices in a tangible form.

In another example, a bus system may be used to implement communications fabric 707 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 707.

Computer program code for carrying out operations of the present invention may be written in any combination of one or more programming languages, including an object-oriented programming language such as Java, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the illustrative embodiments may be applied to a multi-processor data processing system, other than the SMP system mentioned previously, without departing from the spirit and scope of the disclosed subject matter.

Other Enabling Technologies

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various data center architectures including simple n-tier architectures, web portals, federated systems, and the like. The herein also may be practiced in a loosely-coupled server (including a "cloud"-based) environment, whether, private, public, or hybrid.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the control program used for pulse series application and output detection is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

The techniques herein may be implemented in an RPU accelerator array natively.

Having described our invention, what we claim is as follows:

1. A method to secure information in a compute environment having an accelerator configured as an array of Resistive Processing Units (RPUs), the accelerator being configured to perform a computation associated with an application, comprising:
    providing a first input to the RPU array, wherein the first input comprises a first stochastic pulse train;
    detecting a first output from the RPU array, and wherein the first output represents a first state of the RPU array induced by the first stochastic pulse train;
    with the RPU array in the first state, providing a second input to the RPU array, the second input comprises a second stochastic pulse train;
    detecting a second output from the RPU array;
    concatenating the first and second outputs generated by the RPU array into a data string, the data string being cryptographic keying material that is derived from the RPU array serving as a physically unclonable function (PUF); and
    using the data string to secure information in the compute environment;
    wherein the data string is generated by the RPU array in association with the computation performed by the RPU array.

2. The method as described in claim 1 wherein the data string is generated before, during or after the computation.

3. The method as described in claim 1 further including initializing the RPUs in at least one row of the RPU array to an initial mid-range value, and applying a series of pulses to the RPUs in the at least row to generate the first output.

4. The method as described in claim 3 wherein the series of pulses are received from a source of random or pseudo-random data.

5. The method as described in claim 4 wherein the source is a Pseudo Random Pattern Generator (PRPG) that is associated with the RPU array during the computation.

6. The method as described in claim 1 further including performing an additional obfuscation operation during generation of the data string.

7. The method as described in claim 1 wherein the application is a deep learning application and the computation occurs during a learning phase.

8. Apparatus, comprising:
    a hardware processor;
    computer memory holding computer program instructions executed by the hardware processor and configured to secure information in a compute environment having an accelerator configured as an array of Resistive Processing Units (RPUs), the accelerator being configured to perform a computation associated with an application, the computer program instructions comprising program code configured to:
provide a first input to the RPU array, wherein the first input comprises a first stochastic pulse train;
detect a first output from the RPU array, and wherein the first output represents a first state of the RPU array induced by the first stochastic pulse train;
with the RPU array in the first state, provide a second input to the RPU array, the second input comprises a second stochastic pulse train;
detect a second output from the RPU array;
concatenate the first and second outputs generated by the RPU array into a data string, the data string being cryptographic keying material that is derived from the RPU array serving as a physically unclonable function (PUF); and
use the data string to secure information in the compute environment;
wherein the data string is generated by the RPU array in association with the computation by the RPU array.

9. The apparatus as described in claim 8 wherein the computer program code is configured to generate the data string before, during or after the computation.

10. The apparatus as described in claim 8 wherein the program code is further configured to initialize the RPUs in at least one row of the RPU array to an initial mid-range value, and to apply a series of pulses to the RPUs in the at least row to generate the first output.

11. The apparatus as described in claim 10 wherein the series of pulses are received from a source of random or pseudo-random data.

12. The apparatus as described in claim 11 wherein the source is a Pseudo-Random Pattern Generator (PRPG) that is associated with the RPU array during the computation.

13. The apparatus as described in claim 8 wherein the program code is further configured to perform an additional obfuscation operation during generation of the data string.

14. The apparatus as described in claim 8 wherein the application is a deep learning application and the computation occurs during a learning phase.

15. A computer program product in a non-transitory computer readable medium for use in a data processing system to secure information in a compute environment having an accelerator configured as an array of Resistive Processing Units (RPUs), the accelerator being configured to perform a computation associated with an application, the computer program product holding computer program instructions executed in the data processing system and configured to:
provide a first input to the RPU array, wherein the first input comprises a first stochastic pulse train;
detect a first output from the RPU array, and wherein the first output represents a first state of the RPU array induced by the first stochastic pulse train;
with the RPU array in the first state, provide a second input to the RPU array, the second input comprises a second stochastic pulse train;
detect a second output from the RPU array;
concatenate the first and second outputs generated by the RPU array into a data string, the data string being cryptographic keying material that is derived from the RPU array serving as a physically unclonable function (PUF); and
use the data string to secure information in the compute environment;
wherein the data string is generated by the RPU array in association with the computation by the RPU array.

16. The computer program product as described in claim 15 wherein the computer program instructions are configured to generate the data string before, during or after the computation.

17. The computer program product as described in claim 15 wherein the program code is further configured to initialize the RPUs in at least one row of the RPU array to an initial value, and to apply a series of pulses to the RPUs in the at least row to generate the first output.

18. The computer program product as described in claim 17 wherein the series of pulses are received from a source of random or pseudo-random data.

19. The computer program product as described in claim 18 wherein the source is a Pseudo-Random Pattern Generator (PRPG) that is associated with the RPU array during the computation.

20. The computer program product as described in claim 15 wherein the program code is further configured to perform an additional obfuscation operation during generation of the data string.

21. The computer program product as described in claim 15 wherein the application is a deep learning application and the computation occurs during a learning phase.

* * * * *